United States Patent [19]

Miller

[11] 3,723,877

[45] Mar. 27, 1973

[54] TRANSMISSION OF SIGNALS CONTAINING HARMONICALLY RELATED SIGNALS TO OVERCOME EFFECTS OF FADING

[75] Inventor: Ralph La Rue Miller, Chatham, N.J.

[73] Assignee: Bell Telephone Laboratories, Incorporated, Murray Hill, Berkeley Heights, N.J.

[22] Filed: Sept. 3, 1970

[21] Appl. No.: 69,373

[52] U.S. Cl. ......................325/30, 325/38 R, 325/42, 325/65, 178/66 R

[51] Int. Cl. ..............................................H04l 27/10

[58] Field of Search..........325/30, 38, 141, 143, 161, 325/163, 164, 168, 56, 65, 41, 42; 178/66 R, 67, 68

[56] References Cited

UNITED STATES PATENTS

| | | | |
|---|---|---|---|
| 3,582,782 | 6/1971 | Danielsen | 325/7 |
| 3,408,572 | 10/1968 | Wolf | 325/168 X |
| 3,521,185 | 7/1970 | Ley | 331/78 |
| 3,496,465 | 2/1970 | Schroeder | 324/77 |

*Primary Examiner*—Robert L. Richardson
*Attorney*—R. J. Guenther and William L. Keefauver

[57] ABSTRACT

To ensure that signals may be recovered after transmission through a fading medium, each pulse of a coded signal is represented by a carefully formulated collection of harmonically related components. For example, if a sequence of regularly spaced pulses in which the repetition rate determines harmonic spacing is used to represent a binary "one," the absence of pulses or a sequence of pulses with a different repetition rate then represents a "zero." A harmonic detector is used to recover the fundamental component of each group. The fundamental frequency identifies the transmitted code signal. Superior signal recovery despite fading, noise, or phase dispersion results.

4 Claims, 4 Drawing Figures

INVENTOR
R. L. MILLER
BY
ATTORNEY

TRANSMISSION OF SIGNALS CONTAINING HARMONICALLY RELATED SIGNALS TO OVERCOME EFFECTS OF FADING

BACKGROUND OF THE INVENTION

This invention relates to signal transmission and particularly to the transmission of information signals in a fashion such that they may be satisfactorily recovered even though distorted as a result of signal fading or the like.

FIELD OF THE INVENTION

In communication systems utilizing the propagation of radio waves to convey information between transmitting and receiving terminals, an effect characterized by variations in the strength of the received signal and known as fading is often encountered. Although fading may be the result of different transmission factors, including atmospheric effects and discontinuities in the transmission medium, the most common type is caused by propagation of the signal over more than one path followed by a recombination of the components from various paths by vector addition at the receiving antenna. The amplitude of the signal at the receiver antenna is thus dependent on the path length differences and amplitudes of the component signals, both of which can vary with time. The resulting phenomena is known as fading due to multipath interference.

DESCRIPTION OF THE PRIOR ART

A number of techniques for reducing the effects of fading have been proposed. These include frequency diversity systems in which the same signal is transmitted from one terminal station on a number of different carrier frequencies, space diversity systems in which a number of spaced receiver antennas are used to pick up a single frequency signal, and systems which simultaneously use both a number of different frequencies and a number of spaced receiver antennas. These techniques are effective because it is quite unlikely that all signals received, either on different frequencies or at different locations, will undergo the same path influences. Yet, they place a great burden on receiving equipment requirements; either several receivers must be used together, or a special receiver adapted for multiple signal reception must be provided.

SUMMARY OF THE INVENTION

It is the principal object of this invention to reduce the effects of fading in data communication systems.

It is another object of this invention to recover basic signal information at a receiver station despite serious amplitude and phase distortions of the signal possibly resulting from transmission irregularities.

It is yet another object of the invention to gain an advantage over noise in the transmission of signals over a phase-dispersing, fading, medium.

To combat the deleterious effects of fading on a communications signal, it is in accordance with this invention to code an information signal at a transmitter station in a fashion such that, despite fading during transmission to a receiver station, the information can be recovered from the signal received at the receiver station. In coding the information signal, certain harmonic relationships are established which, by the use of a harmonic detector, can be recovered even in the face of serious amplitude and phase distortions. Unlike usual frequency diversity arrangements in which improvement in reception is achieved on the basis of an addition of power in the several channels, improvement in signal reception is achieved in accordance with this invention on the basis of the effective coherent addition of harmonically related signals. With coherent addition, signals are added without regard to phase.

A relatively simple and direct harmonic detection technique, based on the effective coherent addition of harmonically related signals, has recently been described in the literature. The technique is used in M. R. Schroeder U.S. Pat. No. 3,496,465, granted Feb. 17, 1970, to measure the pitch, i.e., the fundamental frequency, of a speech signal. According to the technique, the obscured fundamental frequency of a periodic signal is recovered by determining the smallest common multiple of the periods of detectable harmonic components of the signal. In essence, a "period histogram" is developed from the signal and the fundamental frequency of the signal is indicated by the largest build-up of harmonic submultiple components in the histogram. The ability to detect harmonic relationships of signals in noise by effective coherent addition of components is turned to account in this invention to recover specially coded data signals.

According to this invention, a preestablished different harmonic relation is established for each signal used to represent a symbol of a coded signal. Any one of several forms of coding may be used. For example, a short train of narrow, regularly spaced pulses may be transmitted to represent an "on" or binary "one." The absence of a signal then represents an "off" or binary "zero." Preferably, however, a "zero" signal is represented by a train of pulses having a representation rate different from the train used to represent a "one" signal. Furthermore, any number of sample levels may be coded by selecting a different repetition rate for the train of pulses representing each. The repetition rate of the pulses of each train determines the frequency of the corresponding harmonic, i.e., the spacing of harmonics on the frequency scale. The width and the number of pulses in each train determines the bandwidth of the signal and dictates the parameters of the harmonic detector system used at the receiver.

Since the use of narrow pulses is usually not efficient in terms of the power capability of a transmitter, it is in accordance with an alternative form of the invention to develop harmonically related signals by means of a pseudo-random pulse generator. If correctly programmed, the frequency spectrum and harmonic content of a train of pseudo-random pulses is identical to a corresponding periodic pulse signal. However, a somewhat better peak factor is exhibited by the pseudo-random pulse train so that transmission economies may be achieved and yet an identical harmonic recovery system may be used.

Harmonically distinctive signals, of whatever form, used to represent the code symbols of an information signal, are thereupon transmitted to a receiver station in any desired fashion.

At the receiver, a harmonic detector, which may be of the form employed and described in the above-mentioned Schroeder patent, is used to recover the preestablished harmonic constituency of the trains of pulses representative of code symbols. Thereupon, a conventional decoder converts the recovered pulse train information into binary "one" and "zero" (or multiple level) signals. Since the harmonic relation of each train is known a priori, a selective gate arrangement may be used in the decoder to identify the presence or absence of a code symbol.

BRIEF DESCRIPTION OF THE DRAWINGS

The invention will be fully comprehended from the following detailed description of illustrative embodiments thereof taken in connection with the appended drawings in which.

Figure 1:
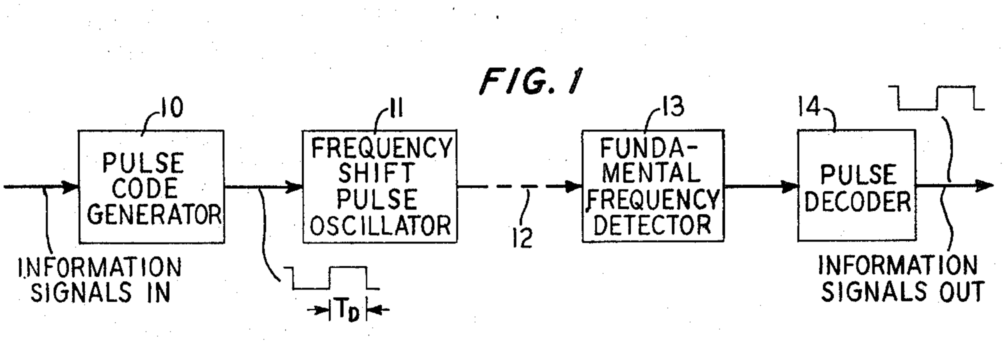
FIG. 1 is a block schematic diagram illustrating a transmission system in accordance with the invention.

A signal transmission system which embodies the features of this invention is illustrated in FIG. 1. Information signals, which may be of any form, for example, speech or data signals, are supplied to pulse code generator 10 of any desired construction. A suitable electronic pulse generating circuit is disclosed in Jones, Jr. U.S. Pat. No. 2,722,660. Generator 10 converts the incoming analog signals into a train of on-off pulses representative of binary "one" and "zero" signals according to any known code. Alternatively, generator 10 may convert the incoming analog signals into a multilevel pulse code, again in accordance with any known technique. Preferably, the individual pulses of the code are of uniform duration. A typical sequence of pulses from generator 10 is illustrated at line A of FIG. 2. In this example the "zero" and "one" segments of the pulse train are indicated to have durations $T_{D1}$ and $T_{D2}$, where the two intervals are equal.

The resulting train of "one" and "zero" pulses, representative of variations in the incoming signal, are delivered to frequency shift pulse oscillator 11. Oscillator 11 responds to generate a train of brief pulses at a prescribed frequency in accordance with the amplitude of the incoming signal. Thus, for example, a "zero" signal as represented by the negative pulse of duration of $T_{D1}$ in line A of FIG. 2 may give rise to a sequence of brief pulses at intervals of $T_{01}$ as illustrated in line B of FIG. 2. The amplitude of the succeeding positive going pulse of duration $T_{D2}$ in this embodiment gives rise to no oscillator output. Thus, the signal of line A is converted by oscillator 11 into the coded pulse train of line B for transmission to a receiver station.

In another embodiment of the invention, a negative going pulse applied to oscillator 11 gives rise, as before, to a train of brief pulses spaced at $T_{01}$ intervals. The succeeding positive going pulse gives rise to a second train of brief pulses of duration $T_{02}$, e.g., by altering the amplitude response characteristic of the oscillator, where the frequency of the two representative trains of pulses are different. In each case, the pulses are selected to be brief as compared to the total duration of the code signal intervals, i.e., $T_D$, in order that the resulting frequency spectrum is essentially flat (within 3 db) to the half frequency point in the frequency spectrum. Spectra of the two coded signal intervals of line C are illustrated in line D of the figure.

Figure 2:
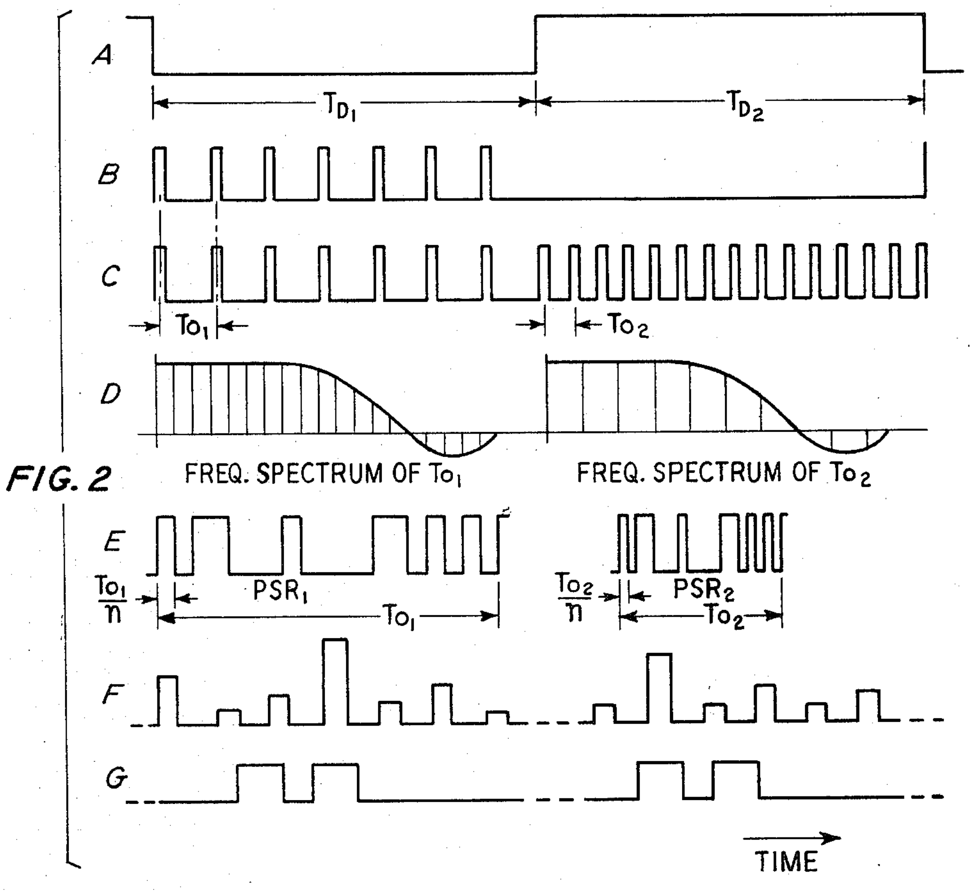
FIG. 2 is a collection of waveforms helpful in explaining the invention.

The trains of regularly spaced pulses as shown in lines B or C of FIG. 2 are thereupon transmitted via communications link 12 in FIG. 1 to a receiver location.

At the receiver, signals are supplied to fundamental frequency detector 13 in order that the fundamental frequency of each successive pulse train interval may be assessed and recovered. It is evident that each interval of the coded signal is represented by a sequence of pulses whose fundamental frequency distinguishes the interval from the other or others in the train. Even though the received signal may be distorted because of signal fading, reflection, phase shift, or atmospheric discontinuities, the harmonic relationship of the pulses in each signal segment is preserved and may be recovered. Accordingly, fundamental frequency detector 13 responds to the incoming pulse trains, despite any distortions in amplitude or phase, and produces an indication of the fundamental frequency of the signal. Detector apparatus suitable for performing this function is described in the above-mentioned Schroeder U.S. Pat. 3,496,465, for example with reference to FIG. 1. Fundamental frequency detector 13 thus generates a period histogram for each signal segment, as shown in line F of FIG. 2, and identifies the time of occurrence of the maximum amplitude pulse for the histogram, this being an identification of the fundamental frequency of that signal segment.

For the example shown in line B wherein the absence of a train of pulses represents one code symbol, a threshold may be used to prevent spurious signals from being possibly interpreted as pulses of a histogram. Moreover, since the fundamental frequency of individual coded signal segments is known, a priori, the identity of the individual detected segment is ascertained, for example, by measuring the frequency of the fundamental or simply by employing a gating signal, as shown in line G of FIG. 2 to permit a pulse at one of the known harmonic frequencies to pass to pulse decoder 14. A suitable arrangement for gating a histogram pulse most likely to represent the fundamental is described in my U.S. Pat. No. 3,535,454, issued Oct. 20, 1970.

Decoder 14 thereupon responds to the presence or absence of a pulse at designated intervals to reconstitute a binary (or higher order) pulse train corresponding to the train illustrated at line A of the figure. Apparatus for performing such a regeneration process is well known in the art. See Rack U.S. Pat. No. 2,957,943.

To assure complete and unambiguous recovery of the harmonic value of each pulse train segment, the individual filters of fundamental frequency detector 13, as illustrated in Schroeder U.S. Pat. No. 3,496,465, must be able to resolve the highest rate pulses employed in the system. Thus, the filters of the detector must be narrow enough to pick out the harmonics of each of the pulse trains used in the system. Filter selection and design to achieve this requirement is within the ordinary skill of those familiar with the art. Similarly, the pulse interval of the successive trains must be sufficiently long to allow the filters to build up to a usable level, i.e., pulse intervals, $T_{D1}$, $T_{D2}$, must be commensurate with the time constant of the individual filters. Again, this is a mere matter of filter design well within the skill of those working in the art.

Transmission of the pulse trains thus described may take place on communications channel 12 using any desired technique. It is recognized, however, that the trains of representative pulses heretofore described, may require considerable power for transmission in view of the relatively high peak factor. It is in accordance with another feature of the invention to improve the peak factor of the transmitted pulse train signals in order to achieve greater transmission economies. Thus, instead of transmitting trains of brief, regularly spaced pulses to represent the binary signals from code generator 10, successive sequences of pseudo-random (PSR) pulses are used to lower the peak factor of the transmitted signal. Each pseudo-random sequence is selected to have the same number of pulses used to represent a corresponding code symbol with regularly spaced pulses, as shown in line C, so that the nominal width of each pulse of the PSR sequence is $1/n^{th}$ of the pulse interval of the train of regularly spaced pulses, i.e., is equal to $T_{01}/n$. The time scale of line E is, therefore, greatly expanded. Note that the intervals $T_{01}$ and $T_{02}$ of line E are identical to the similarly identified intervals in line C. Notwithstanding the greater total number of PSR pulses used at a higher rate to represent each symbol, the spectrum of the resulting sequences of PSR pulses for each symbol is identical to the spectrum of a corresponding train of regularly spaced pulses used to represent the same symbol. Hence, the code representations of lines C and E have the same spectrum, as illustrated schematically in line D. Yet the sequences of PSR pulses of line E have a much lower peak factor and may be more economical to transmit.

The fundamental frequency of the sequences of pseudo-random pulses is determined in a fashion identical to that used to recover the fundamental frequency of regularly spaced pulses since the only difference is the phase of the harmonic components. As noted above, components add together coherently and independent of phase in a period histogram. Recovery takes place in fundamental frequency detector 13 in the fashion described above.

Figure 3:
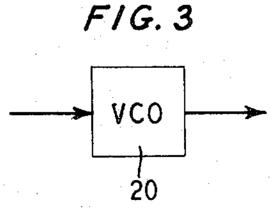
FIG. 3 illustrates one form of frequency shift pulse oscillator which may be used in the system of FIG. 1.
Figure 4:
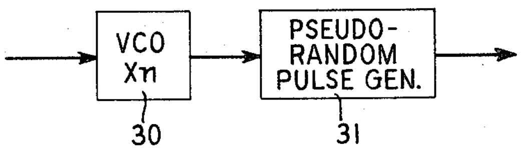
FIG. 4 is an alternative form of frequency shift pulse oscillator which may be used in the practice of the invention.

Frequency shift pulse oscillator 11 thus may take a number of different forms depending upon the nature of the transmitted pulse train. For sequences of regularly spaced pulses, as shown in lines B and C of the figure, a simple voltage controlled oscillator 20 as shown in FIG. 3, of any desired construction, may be employed. For example, suitable voltage controlled oscillators are shown in Fletcher U.S. Pat. No. 3,368,166, Crandall U.S. Pat. No. 3,319,187, Nielsen U.S. Pat. No. 3,293,570, and Thorp U.S. Pat. No. 3,144,622. Such an oscillator produces regularly spaced pulses in dependence on the amplitude, i.e., the voltage, of the signal applied to it. In conventional fashion, the oscillator may be arranged to respond to one, two or more discrete voltage levels, and to ignore all others. Alternatively, as shown in FIG. 4, oscillator 11 may include a voltage controlled oscillator 30 arranged to produce $n$ pulses for each incoming pulse, where $n$ is selected to increase the normal pulse rate of the oscillator above that produced for example, by oscillator 20 in FIG. 3. This train of relatively high rate pulses is then supplied to pseudo-random pulse generator 31 which may, for example, be of the form shown and described in Ley U.S. Pat. No. 3,521,185, granted July 21, 1970. The pseudo-random generator then acts to produce a wave having a repetition period $1/n$ of the input wave.

It is evident that the individual pulse trains employed, according to the invention, for transmitting representations of individual pulse code signals, may be selected from among a variety of waveforms which yield frequency spectra, substantially as shown in line D of FIG. 2. All that is necessary is that the repetitive signals exhibit a harmonic relationship unique to the signal. A variety of such waves will be evident to those skilled in the art. Similarly, alternative arrangements for producing the individual pulse trains representative of coded signals in a fashion that preserves harmonic integrity as well as alternative harmonic detector arrangements, will occur to those skilled in the art to facilitate the practice of the invention.

What is claimed is:

1. Transmission apparatus, which comprises, in combination, means for representing each symbol of a coded information signal by a signal selectively formulated from a collection of pseudo-random pulses to exhibit a prescribed fundamental period, means for transmitting each of said selectively formulated signals to a receiver station, and at said receiver station, means for determining the fundamental period of each of said received selectively formulated signals, and means for identifying each symbol of said coded information signal from the fundamental period determined for each of said received selectively formulated signals.

2. Transmission apparatus which comprises, in combination, means for representing applied data by successive sequences of signals each formulated from a collection of pseudo-random components selected to exhibit a distinctive harmonic period, means for transmitting said sequences of signals to a receiver station, and at said receiver station, means for determining the period of each harmonic present in each of said sequences of received signals, means for detecting the presence of a common multiple of said detected harmonic periods for each sequence of signals, and means for utilizing detected common multiples of said harmonic periods to represent said applied data.

3. A data communications system, which comprises, in combination, means for representing each symbol of a coded data signal by a repetitive signal formulated from a collection of pseudo-random components selected to exhibit a preestablished distinctive harmonic relationship, means for transmitting each of said repetitive signals to a receiver station, and at said receiver station, means for recovering said preestablished harmonic relationship for each of said repetitive signals, and means for utilizing said recovered harmonic relationship for identifying a symbol of said coded data signal.

4. Transmission apparatus as defined in claim 3, wherein, said means for recovering said preestablished harmonic relationship for each of said repetitive signals includes, means for effectively adding received harmonically related signals coherently together.

* * * * *